United States Patent Office 3,353,601
Patented Nov. 21, 1967

3,353,601
COMPOSITION AND USE THEREFOR FOR
WATER SHUT-OFF
Francis E. Dollarhide and Eugene D. Mullen, Tulsa, Okla., assignors to The Dow Chemical Company, Midland, Mich., a corporation of Delaware
No Drawing. Filed July 26, 1965, Ser. No. 475,000
10 Claims. (Cl. 166—33)

ABSTRACT OF THE DISCLOSURE

Effective inhibition of the passage of fluids in underground formations is provided by emplacing in the passageways of such formation a mass of discrete particles previously prepared by bonding an exterior coating of a substantially water-insoluble water-swellable cross-linked particulate polymer to hard granular nuclei by means of an interlayer of a settable adhesive resinous composition.

---

The invention relates to lessening or inhibiting the passage of water or aqueous solutions through channels, fissures, fractures, and passageways in terranean and subterranean strata.

The invention embodies a method of plugging off encroaching water through fissures or fractures, either natural or induced, extending into water or brine zones from an oil- or gas-bearing zone; of inhibiting water or brine intrusion into excavations, e.g. those associated with construction of foundations for buildings, dams, reservoirs, tunnels, mine shafts, and wellbores; of inhibiting loss of water from earthen reservoirs for storage of water or brine, stock watering ponds, irrigation canals, and ditches; of providing subsurface protection prior to paving air fields, parkways, roadways, and prior to grouting; to inhibit lost circulation during well drilling and well-cementing operations. It also embodies the treatment of soil or sand to render it less permeable to water.

A number of attempts have been made to plug off or inhibit water intrusion or the loss of water through terranean or subterranean strata, including implacement of hydraulic cements, settable resins, swellable gums in suspension, and chemicals independently injected which form a precipitate upon contact with each other. There is still a need for an effective agent which will perform a plugging function of this nature.

The invention has special application to alleviating problems associated with fracturing of fluid-bearing subterranean formations.

A normally successful method of stimulating the flow of oil from subterranean oil-bearing strata comprises inducing passages or fractures therein by injecting a fluid, usually containing a propping agent, down the wellbore and into the strata at pressures sufficient to fracture the formation. The propping agent is emplaced in the induced fractures to prevent their closing up after the fracturing pressure has been released. Fluids are able to pass among the particles of propping agent along the fractures. Sometimes the induced fractures extend into water or brine zones adjacent to or near to the oil zone, resulting in an undesirable amount of water or brine being produced with the oil.

A fully adequate plugging agent against intruding or escaping water and brine through cracks and fissures in adjacent or confining strata is not known. A fully satisfactory way of inhibiting loss of water through cracks and fissures or of preventing water or brine from extended fractures from entering into the oil-bearing formation and contaminating the oil being produced is not known. The invention provides an improved composition and method which meets these and related needs.

Broadly the invention is a composition and method of use to inhibit the passage of water. It entails providing a film of a settable fluid resinous adhesive on a particulate material (hereinafter usually referred to as granules which serve as nuclei) of the nature of sand, or of crushed, ground, or otherwise pulverized nut shells, wood chips, coal, ceramic or brick material, perlite, limestone or other rock, calcium carbonate, hard resins, glass, or concrete and, before the adhesive has set, admixing with the particles, provided with said film, a water-insoluble, water-swellable polymer, of a particle size less than that of the granules being coated, which will thereby be adhered as a substantially uniform coating about the particulate or crushed granules employed, and subsequently further drying the resinous coating and effecting complete cure thereof. For effective coating, the mesh size of the particles of polymer should be less than that of the granular material, not over about 0.2 that of the particle size of the granules being recommended. A mass of the so coated granules are employed in a method of inhibiting the passage of water through earth, soil, sand or in cleavages and fractures of rock.

The invention is not to be confused with known methods of closing off the passage of underground aqueous liquids including the emplacement of settable water-stable resins, or the emplacement of physical mixtures of water-sensitive polymers and granular material in underground formations, wherein there is not present, as in the invention, a mass of discrete granules each coated with a surface layer of a water-swellable polymer adhered to the granule by a resin interlayer which polymer, when emplaced in cracks, fractures, and the like, swells upon contact with water and closes the cracks and fractures to the passage of water and brine.

Any granular material that has sufficient strength, when emplaced in a fracture during fracturing, to resist being shattered or flattened to too great an extent when subjected to the pressure exerted by the separated rock formation following fracturing, is satisfactory to employ as the granular nuclei in the practice of the invention. Sand, glass beads, metal pellets, or granulated walnut shell, limestone, ceramic, concrete, or infusible resins, between about 4 and about 60 mesh, are illustrative. Herein, mesh size refers to the schedule of the United States Bureau of Standards Sieve Series.

The resinous adhesive is preferably epoxy resin or polyurethane resin, but it may be polystyrene, polyvinyltoluene, phenol-formaldehyde or urea-formaldehyde. The resin is applied in a fluid tacky state and, after the polymer is adhered thereto, sets to a hard water-stable resin.

The preparation of phenol-formaldehyde resins may be found in Phenolic Resins, by Robitschek and Lewin, published by British Plastics, London (1950).

The preparation of polyurethane resins is described in Polyurethanes by B. A. Dombrow, Reinhold Publishing Company, New York, N.Y. (1957).

Methods of preparing epoxy resins useful as adhesives in the practice of the invention are known. Any of the epoxy resins which exists as a flowable material or which can be dissolved in suitable solvents and which subsequently hardens to a thermoset water-stable solid at room temperature or upon the application of heat is satisfactory. For the preparation of epoxy resins it is suggested that reference be made to Epoxy Resins by Lee and Neville, McGraw-Hill Book Company, New York, N.Y. (1957); Epoxy Resins by Skeist, Reinhold Publishing Company, New York, N.Y. (1958); High Polymers, vol. X, Polymer Processes by Schildknecht, Interscience Publishers, New York, N.Y. (1955); or Epoxydverbindungen and Epoxydhorze by von A. M. Paquin, published by Springer-Verlag, Heidelberg, Germany (1958); or to readily available acceptable epoxy resins by reference to Epoxy Resins Manual published by The Dow Chemical Company.

The water-swellable polymer may be any water-swellable, water-insoluble organic polymer of which cross-linked polyacrylamide, polyurethanes, polyvinylmorpholinone, polyoxazolidinone, polyacrylic acid, sulfonated polystyrene, and sulfonated polyvinyltoluene are illustrative. Methods of preparing these polymers are known.

Polyacrylamide, polyvinylmorpholinone, or polyvinylpyrrolidone, may be prepared either by irradiation or by polymerizing with a cross-linking agent in the presence of a suitable polymerization catalyst. The cross-linking agent is employed in an amount between about 300 and 5000 parts per million (p.p.m.) based on the weight of the acrylamide monomer.

Illustrative of cross-linking agents employed are divinylbenzene, divinyl ether of ethylene glycol and N,N'-methylenebisacrylamide. The catalyst is of the free radical type, e.g. a suitable oxygen-containing catalyst such as an organic peroxide or hydroperoxide or a persulfate or chlorate of sodium, potassium, or ammonium. It may also be prepared, if desired, in the presence of a redox catalytic system which consists essentially of both an oxidizing agent and a reducing agent which permits polymerization at lower temperatures. Examples of redox catalysts are $H_2O_2$ or $K_2S_2O_8$ with $Fe^{++}$, $Cu^+$, or $Sn^{++}$ ions or with $NaHSO_3$, $Na_2S_2O_4$, $Na_2S_2O_3$ or $Na_2S$.

Either the monomer or a previously prepared linear polymer thereof may be used in the preparation of the cross-linked polymer. Polymerization may be either en masse, i.e. without use of a liquid reaction medium, or in an aqueous or a lower aliphatic mono-alcohol solution. It is preferable that the cross-linking polymerization be carried out in an aqueous solution of at least about 5 percent concentration. Best results are obtained when a monomer or linear polymer, in a concentration of between about 20 and 90 percent in water (and usually between about 25 and 90 percent) by weight of the reaction mixture, is employed. A chemical cross-linking agent is necessary when employing a chemical catalyst and is recommended when employing irradiation. The cross-linking agent is employed in an amount of between about 0.02 and 10.0 percent (preferably between about 0.2 and 5.0 percent), based on the weight of the polymer. A reference which discusses the preparation of a polymer suitable for use in the practice of the invention may be found in U.S. Patent 2,810,716. Cross-linking agents which may be used in preparing the polymer for use in the practice of the invention include any of those set out therein, e.g. column 2, lines 53 to 68.

When the cross-linked polymer is prepared by an irradiation technique, between about 0.5 and 15.0 megarads are usually used and preferably between about 0.75 and 3.0 megarads. The extent of irradiation is that which produces a cross-link polymer, e.g. poly(N-vinylpyrrolidone) or polyacrylamide which is insoluble but swellable in water or aqueous liquids of the nature of underground water and brines.

Care must be exercised in the polymerization to control the extent of cross-linking so as to provide one which is sufficiently cross-linked to be insoluble in water and aqueous liquids but which will still swell on contact with water or brine.

A typical procedure for preparing a cross-linked polymer by irradiation is as follows: an aqueous solution, containing about 50% by weight of N-vinylpyrrolidone, is irradiated with a dose of about 0.805 megarad from about a 3500-Curie Cobalt-60 source of gamma rays at a dosage rate of about 0.23 megarad/hour. The polymer so made is separated from the reaction medium, dried in an oven for about 8 hours at a temperature of about 120° C., and then ground to a powder such that substantially all will pass through a 100 mesh screen.

As an alternative procedure for preparing the polymer for use in the practice of the invention, 450 grams of N-vinylpyrrolidone, 0.9 grams of $\alpha,\alpha'$-azobisisobutyronitrile (as a catalyst dissolved in 0.45 milliliter of 1-amino-1,2-propanol), 2.25 grams of divinyl ether of diethylene glycol, and 1800 milliliters of water are placed in a suitable container and heated for about 8 hours under a protective blanket of nitrogen at from about 70° to 80° C. The polymer so formed is separated (as by filtration), dried, e.g. by being placed in an oven at between 80° and 120° C., and then ground to a suitable size powder.

Illustrative of another procedure for preparing the polymer useful in the practice of the invention is a combination of the above two procedures which comprises irradiating a monomer, e.g. N-vinylpyrrolidone, together with a cross-linking agent to provide an initiating source of free radicals. As illustrative, a sample of N-vinylpyrrolidone containing 0.5 percent by weight of N,N'-methylenebisacrylamide as cross-linker, is exposed to a dosage of 2.4 megarads gamma radiation from a Cobalt-60 source.

A method of preparing a water-swellable, water-insoluble polymer of a polyglycol and a diisocyanate is described in U.S. Patent 3,054,778.

The amount of polymer to employ is such that, after the polymer-coated granules are contacted with water or brine, the resulting swelled polymer will completely fill all the interstices and render the mass substantially impenetrable to the water or brine.

The optional relative amounts to use of each of the granular nuclei material, the adhesive, and the polymer are dependent upon the nature of each of the ingredients, particularly the particle size of the granular core material and the nature of the polymer.

A polymer, which was found to swell 70 times its dry volume when wetted with water, was prepared by cross-linking polyacrylamide with methylenebisacrylamide, e.g. 4500 p.p.m. of the methylenebisacrylamide. This polymer, having a density of 1.35 grams per cubic centimeter, is employed with 20 to 40 mesh sand.

The amount of such polymer usually employed is usually between about 4 and about 15 parts per 100 parts by weight of granular material, having a density comparable to that of the sand.

The amount of granular material, such as the sand, crushed walnut shell, or the like employed in the invention is substantially greater than that of the adhesive. As a practical guide, the amount of adhesive employed should be just sufficient to wet, i.e. coat completely, each discrete granule nucleus as nearly as practical and yet not provide a coating of such thickness that it tends to cause the particles to adhere to one another or to require an undue length of time for it to harden. The use of excessive adhesive should be avoided because, unless careful control of the amount thereof to the other components of the composition is observed, the water-swellable polymer itself may become coated with the adhesive and thus be unable to swell properly upon subsequent contact with water or aqueous liquids. Excessive resin may also result in the entire composition tending to become a consolidated mass during the preparation thereof. The proportion of resinous adhesive to granular material to be coated, having a density similar to sand, is usually between about 0.5 and 5.0 parts per 100 parts of the granular material.

In general, the amount of resinous adhesive is usually from about 0.2 to 1 times the weight of polymer employed, about twice as much water-swellable polymer by weight as of the resinous adhesive commonly being used.

In carrying out the embodiment of the invention, employing epoxy resin as the adhesive, the granules of the nature of sand, wood chips, crushed nut shell, or the like are admixed with a liquid epoxy resin which is settable by having admixed therewith a proper amount of a hardening agent, e.g. an amine, dicarboxylic acid, or amide, and allowed to partially dry, and thereafter the so coated granules admixed with the water-swellable polymer, having a particle size less than that of the granules being coated. The resulting composition is then cured by subjecting it to a temperature anywhere between room temperature and about 250° C. Room temperature is satisfactory but requires a longer time than an elevated temperature. A curing temperature of between about 50° C. and 200° C. is commonly used. As a result, the swellable polymer is tightly adhered by the epoxy resin to the discrete granules or particles and forms a readily flowable mass than can be pumped or conveyed as may be convenient, e.g., by a movable apron, belt, or the like or be slurried in oil and forced into the earthen or rock crevice, crack, or fracture where unwanted water or brine tends to pass.

When practicing the invention for plugging off a crack or fracture in an earthen formation, a mass of the polymer-coated granules, preferably oil wetted or slurried in oil, preferably to make a high concentration, as in Diesel oil, crude oil, kerosene, or the like, is forced into the fissure, fracture, or other channel of terranean or subterranean strata in which it is desired to inhibit the passage of water. To render soil less permeable to water or brine, the soil may be mixed with the polymer-coated granules and replaced, as in the bottom of an earthen storage reservoir.

When used in association with formation fracturing, the coated granules may be used as the propping agent during fracturing. They may be employed only in the first stage to provide a spear-head, be employed only in the last stage, or throughout the operations. A fluid loss control agent, if desired, may optionally be admixed with the oil and propping agent to lessen the loss of fluid to the formation. In some instances, it is recommended that some pressure be maintained on the emplaced slurry until water has been in contact with the water-swellable polymer for a sufficient time to result in appreciable swelling of the polymer.

To carry out the embodiment of the invention involving the treatment of a formation penetrated by a well for the purpose of plugging off intruding water, the composition, prepared as described broadly hereinabove and set out in more detail hereinafter, is injected down the well and forced back into the fissure, fracture, or channel in the stratum, through which the passage of water or aqueous liquid is to be inhibited, and preferably held in place by adequate pressure until contacted by water or aqueous solution in the strata.

When the invention is carried out as a fracturing operation, the so coated granules are admixed, in an amount of between about 0.1 pound and 10 pounds per gallon of an oil fracturing fluid. Mixing may be done in a mixing tank to make a slurry prior to injecting it down the well, but preferably is done while the oil is being injected down the wellbore. The injection rate is sufficiently great to produce fractures in the formation and to emplace some of the polymer-coated granules in the fractures as they are created. Fracturing, employing the coated granules of the invention may be carried out employing, generally, techniques which obtain in the fracturing art. A fluid loss agent, e.g. that described in U.S. Patent 2,779,735, may be employed in the oil with the polymer-coated propping agent. If desired, the novel propping agent may be injected in a first stage treatment to initiate a water shut off followed by use of conventional propping agent.

When a fissure or natural crack exists in strata comprising the walls of an excavation as that for a foundation of a building or the exposed faces of a tunnel, water or brine storage reservoirs or in subsurface strata such as those beneath earthen dams or comprising part of earthen dams and beneath roadbeds and hard surfaces of courts, parks, and the like, particularly where aqueous cement compositions are employed as the surfacing material or in grouting, the compound of the invention is forced into the fissure or crack and held so emplaced until contacted with water.

The following procedure is illustrative of a convenient and efficient way of employing sand as the granules to which cross-linked polyacrylamide, as the water-swellable polymer, is adhered by the epoxy resin. It is to be understood, however, that other granular material to form the core or center of the discrete particles and other polymers to provide the water-swellable coating may be employed with the epoxy adhesive within the scope of the invention.

(1) To 100 parts by weight of ungraded natural sand is added 1 part by weight of a mixture of a suitable epoxy resin and a hardening agent, e.g., a sufficient amount of a primary and/or secondary amine or polyamine to provide about one amino group for each oxirane group on the epoxy resin. During the addition of the settable epoxy resin to the sand, stirring is maintained to insure a thorough distribution of the resin and thereby provide a substantially even coating of the epoxy resin on the individual sand grains. (2) about 5 parts by weight of a polymer, e.g., the N,N'-methylenebisacrylamide cross-linked polyacrylamide prepared as above, having a particle size less than that of the sand and preferably not greater than about 0.2 or 0.3 of that of the sand, is admixed with the sand grains coated with the so prepared epoxy resin mixture, with continued moderate agitation to insure even distribution of the polymer and intimate contact with the epoxy resin coated sand grains. (3) The so prepared material comprising the polymer adhered by means of the epoxy resin to the sand grains is then aged at ambient or elevated temperatures to cure the epoxy resins. Best results are obtained by maintaining some degree of movement or agitation of the particles while warm air is being blown among them. Any of the many known types of driers providing agitation and air movement may be employed. A particularly suitable drying technique is to pass the polymer-coated sand particles along a chute as by means of an auger while hot air is being passed through and over the moving mass of particles. At the end of the chute, while maintaining the flow of hot air, the stream of coated granules is allowed to fall into a receptacle, e.g. a funnel, where they are conveniently bagged in readiness for shipment or storage. At this stage, the epoxy resin is cured enough to act as an adhesive but additional cure will occur for some time thereafter. (Such additional cure enhances the handling properties of the resin-coated granules.) The polymer layer is thereby tightly bonded to the individual sand grains. The granules so coated, even though additional cure will subsequently occur, are flowable or pumpable as so made and do not form clumps or lump into a consolidated mass.

The following test demonstrates the effectiveness of a composition of the invention prepared according to the example above in preventing the passage of water therethrough. The test simulates underground conditions where a high differential pressure exists, as in a fracture in a subterranean stratum. The test is conducted according to the following procedure: 9 grams of epoxy resin prepared as above illustrated, are admixed with 900 grams of 20 to 40 mesh sand. The epoxy resin and granules are mixed thoroughly as above suggested until the granules are well wetted, i.e. provided with a film or coating of the resin.

At that time 45 grams of finely ground water-swellable polymer are admixed therewith, whereby an outer coating of the polymer is adhered to the epoxy resin of each granule. The so coated sand particles are then spread out substantially uniformly and allowed to cure. About 12 hours at room temperature are satisfactory for sufficient cure but a longer time may be employed. The amount of sample thus prepared is slightly greater than that which will fill two standard size laboratory test cells, described below.

Each test cell consists of a 1-inch, high-pressure pipe nipple, 12 inches long. It is positioned vertically in a support. Provision is made to connect each end of the 1-inch nipple to a ¼-inch pipe section by means of a 1-inch threaded coupling and a 1-inch to ¼-inch bushing.

Each of the ¼-inch pipe sections is provided with a suitable valve to control the flow of fluids. The upper ¼-inch pipe section may be connected, preferably through a quick-connecting ("Snap-on") fitting, to a reservoir containing water or aqueous liquid, e.g. a 5% by weight NaCl brine. The lower ¼-inch pipe section leads to a vessel for collecting liquid which passes through the cell.

The cell is then prepared for testing by fitting a 150 to 250 mesh screen into the lower coupling (at the outlet of the cell) and then securing the lower bushing onto the cell. The cell is then firmly packed to within ½ inch of the upper coupling (at the inlet of the cell) with kerosene-wetted particles comprising the water-swellable polymer bonded by the epoxy adhesive to the sand grains. A screen is then fitted, as aforesaid, on the top of the material to be tested and thereafter the upper bushing is fitted into place. The so prepared cell is then positioned in the apparatus and connected to the reservoir containing the water or aqueous solution which is capable of swelling the polymer.

The water or aqueous solution in the reservoir is placed under 50 pounds per square inch gauge pressure (p.s.i.g.) and 50 milliliters of the water or brine are caused to flow until it drips from the cell. Flow is then stopped by closing the valve at the outlet of the cell and the cell is allowed to stand for 30 minutes to insure wetting of the polymer coating. The outlet valve is then opened for fluid flow and the pressure on the reservoir increased at 100 pounds per square inch increments during each of successive 30-minute intervals until the final desired test pressure (e.g. 1000 p.s.i.g.) is reached. This pressure is retained on the sample for the duration of the test. The extent of effective water shut-off by the presence of the polymer coated granules according to the invention is then ascertained by the amount of brine, if any, that flows from the cell.

The following examples were run to show the effectiveness of the invention.

EXAMPLE 1

According to the above procedure a water plugging composition was prepared, employing: (1) D.E.R. 331 epoxy resin (the diglycidyl ether of 4,4'-isopropylidenediphenol, which has an epoxide equivalence of between about 186 and 192), in admixture with about 10 parts of diethylenetriamine per 100 parts of the epoxy; (2) 20 to 40 mesh sand; and (3) polyacrylamide, cross-linked with 4500 parts per million of N,N'-methylenebisacrylamide, in a weight ratio of 1 epoxy resin-hardener mixture, 100 of the sand, and 4 of the polyacrylamide. The sand grains were coated according to the procedure set out above wherein the fluid epoxy resin was uniformly applied to the sand grains, and thereafter while the epoxy resin was still adhesive, an outer coating of the water-swellable cross-linked polyacrylamide was applied and the epoxy resin was completely cured at 200° C. for 5 minutes thereby forming a composition of discrete particles. (Comparable cure may be effected at 60° C. for about 10 minutes or at 25° C. for about 120 minutes.) The testing procedure for efficacy in shutting off water, as set out above, was conducted.

Three replicate test samples were prepared and run employing 5% NaCl brine at a final test pressure of 1000 pounds per square inch. All three tests were highly successful, showing no brine leakage after 30 days. The tests at that time were discontinued.

EXAMPLE 2

For the purpose of demonstrating that different sizes of granules may be coated according to the invention, four tests were run employing 9 parts of the epoxy resin adhesive and 36 parts of the cross-linked polyacrylamide and 900 parts of sand. In two of the tests 20 to 40 mesh sand was employed and in the other two tests, 10 to 20 mesh sand was employed. The procedure followed for preparing the particulate material was otherwise the same as that of Example 1. Each of the test samples so made was run using 5% NaCl brine at a maximum pressure of 1300 p.s.i.g. for a period of 16 days. At the end of the test period, there was no brine leakage through any of the samples, showing that the test was fully successful. The test was then discontinued.

The following examples demonstrate the use of other adhesive material than epoxy resin. The water swellable polymer employed was acrylamide cross-linked with 4500 p.p.m. of methylenebisacrylamide.

EXAMPLE 3

Twenty grams of 18–40 mesh sand were coated with about 1 gram of polyurethane, known as Epo-Lux No. 550. They were then admixed with 1 gram of 70–170 mesh cross-linked polyacrylamide and dried, in a thin layer in a hot air oven at 105° C. for 30 minutes. The polymer-coated sand grains were examined and found to be substantially 100% coated discrete particles but indicated some tendency to stick together. They were tested for swelling by placing 1.0 gram of the so coated grains into a 10-ml. graduate, observing the volume, and adding sufficient water to wet the polymer coating. After an hour, the volume was again observed. The result is shown in Table I.

EXAMPLE 4

The procedure of Example 3 was repeated except that 18 grams of sand, about 1 gram of adhesive, and 2 grams of polymer were used. The resulting discrete particles showed no tendency to stick together and showed good handling properties. 1 gram of the so coated grains was tested for swelling as in Example 3. The results are shown in Table I.

EXAMPLE 5

Example 3 was repeated except 19 grams of sand, about 0.5 gram of adhesive, and 1 gram of polymer were used. The dried polymer-coated grains showed excellent handling properties. 1 gram of the so coated grains was tested for swelling as in Examples 3 and 4. The results are shown in Table I.

TABLE I

| Ex. | Weight Proportions Used To Prepare Composition | | | Sample Wt. of Comp. in gm.* | Swelled Volume of 1 gram of water-wet polymer-coated Mass (cc.) |
|---|---|---|---|---|---|
| | Sand | Adhesive | Polymer | | |
| 3 | 20 | 1 | 1 | 1 | 3.6 |
| 4 | 18 | 1 | 2 | 1 | 6.6 |
| 5 | 20 | 0.5 | 1 | 1 | 3.6 |

* One cc. of the unswelled polymer weighted about 1.35 g.

Reference to Table I shows that adequate swelling of polymer occurred, as evidenced by the enlarged volume of the polymer-coated mass to completely close off the interstitial voids in the sand, since, as hereinbefore noted, such voids comprise only about 30% to 35% of the volume.

EXAMPLE 6

To show the efficacy of the invention to condition soil or sand comprising the bottom and sides of a pit to be used for storage of brine or water, the soil or sand to a depth of about 6 inches to about two feet is scooped up, as with the earth moving equipment employed to dig the pit, intermixed, as with a sand-cement blender, with a sufficient amount of the water-swellable polymer-coated granules of the invention to occupy when wetted the interstitial space of the saind or soil, and then spread out on the bottom and sides, and tamped. Upon being wetted with water or brine, the polymer swells and inhibits the flow of water therethrough.

EXAMPLE 7

To show the efficacy of the invention to plug off a crack or opening of appreciable size in the bottom or side of an otherwise adequately water-tight pit, a mass of the water-swellable polymer-coated granules of the invention is packed into the crack or opening. When water contacts the polymer coating, it swells and plugs off the crack or opening.

EXAMPLE 8

The following series of fracturing treatments, in accordance with the invention were performed on oil wells in a formation wherein wells heretofore, after conventional fracturing, had "gone to water," i.e. produced substantially all water with no appreciable oil. The wells were located in Dawson County, Tex., Noble County, Okla., and in Reno, Rice, and Ness Counties, Kans.

The wells were producing from formations overlying water- or brine-bearing strata. The wells were fractured as follows: 20–40 mesh sand was wetted with fluid epoxy resin and then coated with the water-swellable copolymer of polypropylene glycol and diisocyanate prepared according to U.S. Patent 3,054,778, according to the general procedure of Example 1.

The wells were fractured in two stages: (a) lease crude oil and polymer-coated 20 to 40 mesh sand were blended as the oil was pumped down the wellbore of the well to be fractured and back into the formation, thereby depositing the polymer-coated sand in the lower portions of fractures and passageways in the formation and thus in a position to divert subsequent fractures upwardly and outwardly from the wellbore, rather than downwardly (as broadly taught in the Braunlich patent application (S.N. 331,524), filed Dec. 18, 1963); (b) injecting additional lease oil blended with uncoated 20 to 40 mesh propping sand or nut shell at a higher rate of injection than the previous injection when using the polymer-coated sand. The wells were then put back in production.

The table below gives the rate of injection, total gallons of oil, pounds of sand or nut shell, rates of production before and after treatment of representative wells.

| Well Location | Stage 1 | | | Stage 2 | | | Production | | | |
|---|---|---|---|---|---|---|---|---|---|---|
| | B.p.m.[1] | Propping Agent[2] (lb.) | Gallons of Lease Oil | B.p.m.[1] | Propping Agent | Carrier Fluid | Before Treatment | | After Treatment | |
| | | | | | | | Oil | Water | Oil | Water |
| Noble Co., Oklahoma | 5 | 1,500 | 1,000 | 16 | 20–40 sand+12–20 nutshell. | 6,000 gal. Petrogel[3] | 16 | 6 | 60 | 18 |
| Rice Co., Kansas | 4 | 500 | 750 | 9 | 4,000 lb. 20–40 sand | 4,000 gal. lease oil | 9 | 9 | 35 | 40 |
| Ness Co., Kansas | 4 | 500 | 1,000 | 6 | 2,000 lb. 20–40 sand and 100 lb. 20–40 nutshell. | 2,500 gal. lease oil | 10 | 3 | 36 | 1 |

[1] 42-gallon barrels per minute.
[2] 20–40 mesh sand coated with polymerized polyglycol-diisocyanate adhered to the sand by epoxy resin.
[3] Crude oil containing a thickening agent to aid suspension of particles.

Reference to the table shows that the oil production was stimulated to a greater extent than water production. These results signify marked success, since, as heretofore stated, fracturing in the formation employing conventional propping agents had resulted in near or complete loss of the well due to excessive encroachment of water into the oil producing strata.

Having described our invention what we claim and desire to protect by Letters Patent is:

1. The method of inhibiting the passage of water and aqueous liquids through fissures, fractures, and passageways in terranean and subterranean strata which comprises emplacing in said fissures, fractures, and passageways a mass of discrete particles of a size of from about 4 to about 325 mesh, said particles consisting essentially of a water-insoluble water-swellable cross-linked particulated polymer bonded by means of an interlayer of hardened resin composition, to hard granular nuclei which provide durable cores for said particles, said particulated polymer having an average particle size not greater than about 0.2 of that of said granular nuclei.

2. The method according to claim 1 wherein said discrete particles are slurried in oil prior to emplacement in said fissures, fractures, and passageways.

3. The method according to claim 1 wherein greater than atmospheric pressure is maintained on said discrete particles until at least a portion thereof has been contacted by water.

4. The method of fracturing a subterranean hydrocarbon-bearing stratum penetrated by a wellbore comprising injecting down the wellbore and into the stratum at fracturing pressures an oil having suspended therein a propping agent consisting essentially of discrete particles of an average size between about 4 and 200 mesh, substantially each discrete particle consisting essentially of a hard granular nucleus, a water-stable resinous interlayer, and an outer enveloping layer of a cross-linked water-insoluble, water-swellable particulated polymer bonded to said granular neucleus by the resinous interlayer, the particle size of said polymer being not more than about 0.2 of that of the average size of said granular nucleus.

5. The method according to claim 4 wherein the resinous interlayer is a cured solid infusible epoxy resin.

6. The method according to claim 4 wherein the well is closed in without relieving the pressure at the wellhead to maintain pressure for a time on the emplaced polymer-coated granular nuclei.

7. The method according to claim 4 wherein a fluid loss control agent is present in said oil.

8. The method according to claim 4 wherein fracturing is performed in two stages comprising (a) injecting an oil containing between 0.25 and 10 pounds of said discrete particles per gallon to inhibit the tendency of water to enter the hydrocarbon-bearing stratum from a subjacent water stratum; (b) injecting oil containing a substantially non-water-swellable propping agent at fracturing pressures.

9. The method according to claim 8 wherein the rate of injection in step (b) is greater than in step (a).

10. The composition consisting essentially of a mass of discrete particles composed of hard core nuclei, an interlayer of resinous adhesive epoxy resin containing a hardening agent therefor, and an outer layer of a water-insoluble water-swellable cross-linked particulated polymer selected from the group consisting of (1) copolymerized diisocyanate and a polyglycol prepared according to Example 1 of U.S. Patent 3,054,778 and (2) polyacrylamide, said outer layer being bonded by the interlayer of epoxy resin to said nuclei thereby forming an enveloping outer coating therefor, said particulated polymer having an average mesh size of not more than the average size of said nuclei.

References Cited

UNITED STATES PATENTS

| | | | |
|---|---|---|---|
| 2,650,195 | 8/1953 | Cardwell et al. | 166—33 |
| 2,823,753 | 2/1958 | Henderson et al. | 166—42 X |
| 3,026,938 | 3/1962 | Huitt et al. | 166—42 |
| 3,054,778 | 9/1962 | Honea et al. | 260—77.5 |
| 3,150,726 | 9/1964 | Bodine | 166—33 X |
| 3,181,612 | 5/1965 | West et al. | 166—33 |
| 3,281,354 | 10/1966 | Scott et al. | 166—42 X |

CHARLES E. O'CONNELL, *Primary Examiner.*

STEPHEN J. NOVOSAD, *Examiner.*